Figure 1:
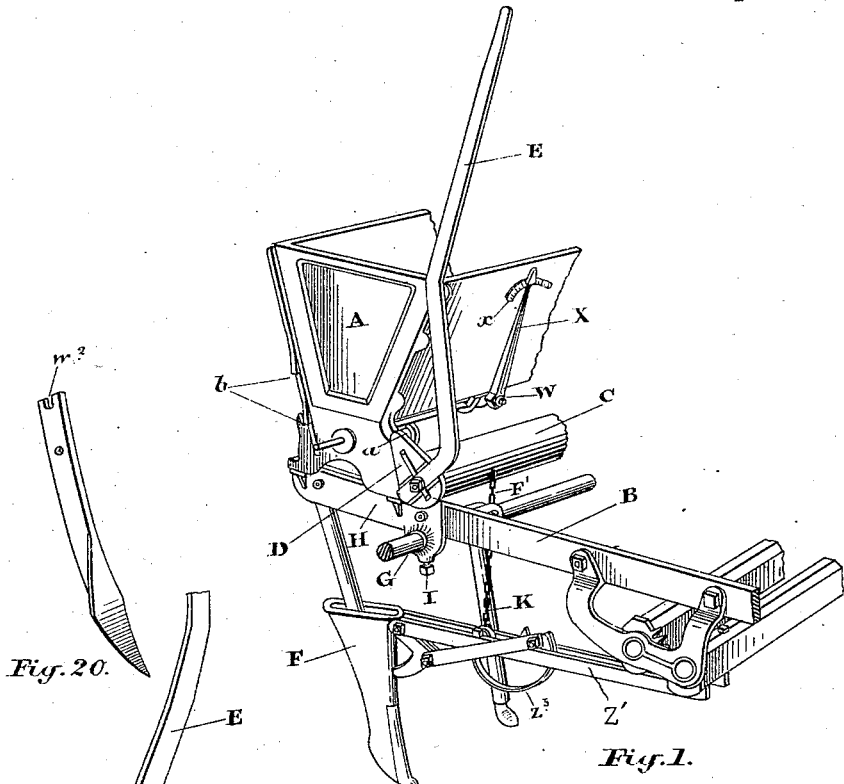

(No Model.) 3 Sheets—Sheet 1.

W. COULTHARD & J. LARSEN.
COMBINED SEED DRILL AND BROADCAST SCATTERER.

No. 285,234. Patented Sept. 18, 1883.

Witnesses.
Lewis Tomlinson
Chas. C. Baldwin

Inventor
Walter Coulthard
John Larsen
by Donald C. Ridout & Co.
Attorneys.

(No Model.) 3 Sheets—Sheet 2.

W. COULTHARD & J. LARSEN.
COMBINED SEED DRILL AND BROADCAST SCATTERER.

No. 285,234. Patented Sept. 18, 1883.

(No Model.) 3 Sheets—Sheet 3.
W. COULTHARD & J. LARSEN.
COMBINED SEED DRILL AND BROADCAST SCATTERER.
No. 285,234. Patented Sept. 18, 1883.
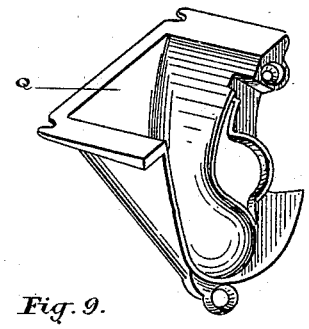
Fig. 9.
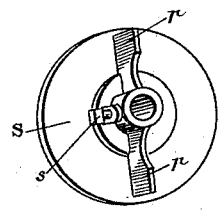
Fig. 11.
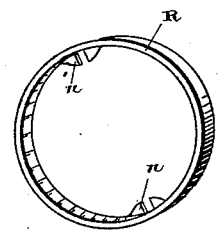
Fig. 12.
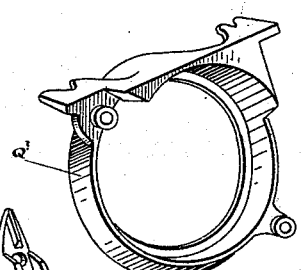
Fig. 10.
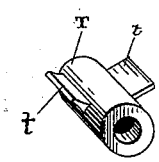
Fig. 13.
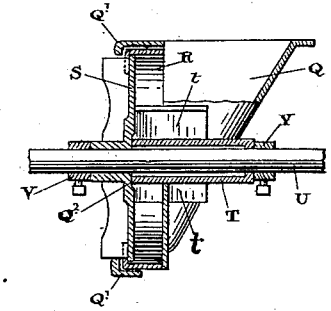
Fig. 14.
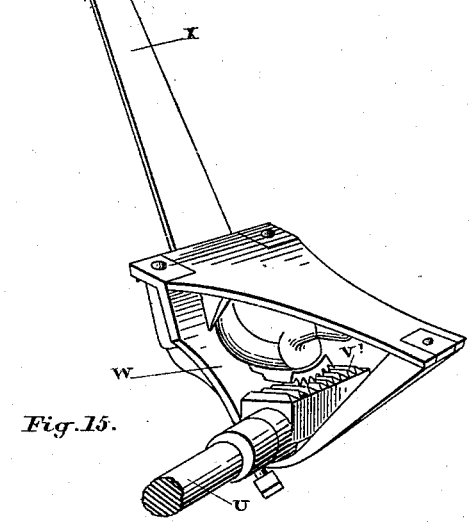
Fig. 15.
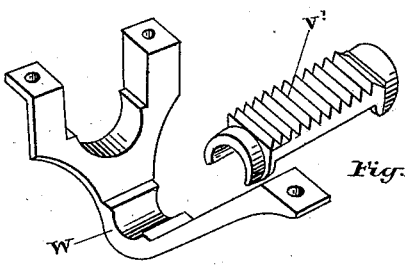
Fig. 17.
Fig. 16.
Witnesses.
Lewis Tomlinson
Chas. C. Baldwin
Inventor.
Walter Coulthard
John Larsen
by Donald C. Ridout & Co.
Attorneys.

UNITED STATES PATENT OFFICE.

WALTER COULTHARD AND JOHN LARSEN, OF OSHAWA, ONTARIO, CANADA.

COMBINED SEED-DRILL AND BROADCAST SCATTERER.

SPECIFICATION forming part of Letters Patent No. 285,234, dated September 18, 1883.

Application filed March 1, 1883. (No model.)

*To all whom it may concern:*

Be it known that we, WALTER COULTHARD and JOHN LARSEN, both subjects of the Queen of Great Britain, residing at the town of Oshawa, in the county of Ontario, in the Province of Ontario, Dominion of Canada, have invented certain new and useful Improvements in Combined Seed-Drills and Broadcast Scatterers, of which the following is a specification.

Our invention relates to certain improvements in combined seed-drills and broadcast scatterers; and its object is to simplify the construction of the component parts of the machine, to arrange each part so that it will effectually perform its particular function, and combine the whole together so that they shall constitute a complete and effective machine.

It consists, first, in providing a lifting-roller having brackets attached at either end, with a pivot-pin cast on each and arranged to fit into gabs or notches formed on the front of each hopper end, so that the lifting-roller is located in front of the hopper and may easily be placed in position or removed therefrom; secondly, in attaching a hand-lever to one end of the lifting-roller and arranging it to operate with notches formed on the back of the hopper end, so that the said lever, when drawn upon to lift the drills, may be held by the notches in any desired position; thirdly, in providing a machine with a rectangular metal frame so braced by the axle of the machine that it cannot be twisted; fourthly, in forming the grain-tube funnels in two parts, having the inner edges of each part longitudinally rounded to enable the diameter of the hopper-bottom to be contracted, so as to permit the lugs or pins which are cast on the outside of each part to pass from the mouths of the tubes to the holes in the tubes made to receive them; fifthly, in forming upon a scattering-tube funnel which is made in two parts the lower half of an axle-bearing, and in pivoting within the hopper a cap to form the upper half of the bearing, a single bolt being provided to hold the two together, so as to grasp the axle with sufficient tightness to hold the scatterer in position for work, but so that it is permitted to yield if it comes against an obstruction; sixthly, in providing a broadcast-scattering board held in position by brackets secured to the frame of the machine, and having hinged to it a board carrying the grain-conductors, the said board being so arranged that by altering the angle of its inclination the conductors may be caused to direct the grain either to the drill or to the broadcast scatterer; seventhly, in providing a bracket attached to the frame of the machine and arranged to hold the scattering-board rigidly in position, and at the same time provide a support for the grain-conductor's board hinged to it, when the said board is set so as to direct the grain into the drills; eighthly, in providing a distributing-wheel with one adjustable sleeve fitting into a recess formed in the face of the loose back of the distributing-wheel, and having two wings, one to form a cut-off and the other a stop; ninthly, in forming a connection between the loose back of the distributing-wheel and the revolving rim of the same, so that the loose back may be adjusted longitudinally within the distributing-wheel without breaking the connection between the two; tenthly, in providing simple mechanism by which the feed of all the wheels may be simultaneously adjusted by the movement of a single lever; and, finally, in the formation and arrangement of other details, hereinafter more particularly explained.

Figure 2:
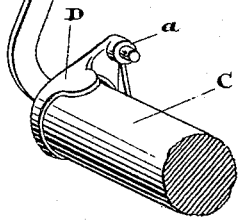
Figure 3:
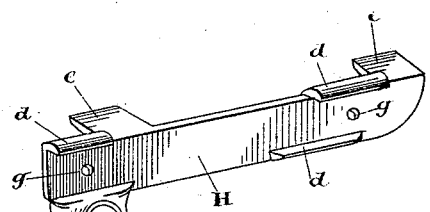
Figures 18, 19:
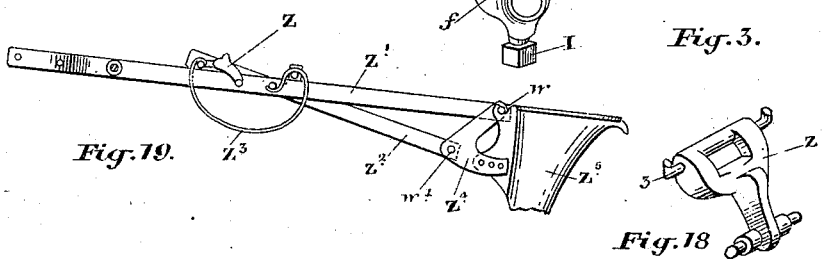
Figure 4:
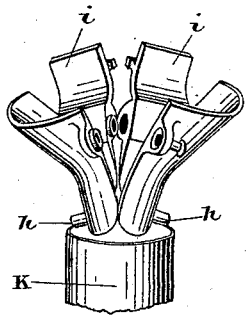
Figure 5:
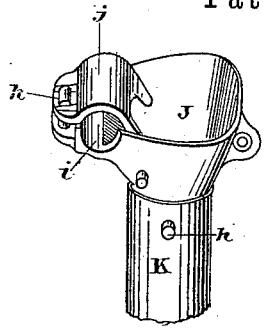
Figure 8:
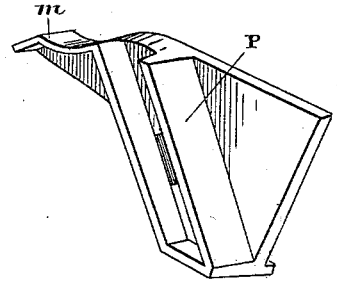
Figures 6, 7:
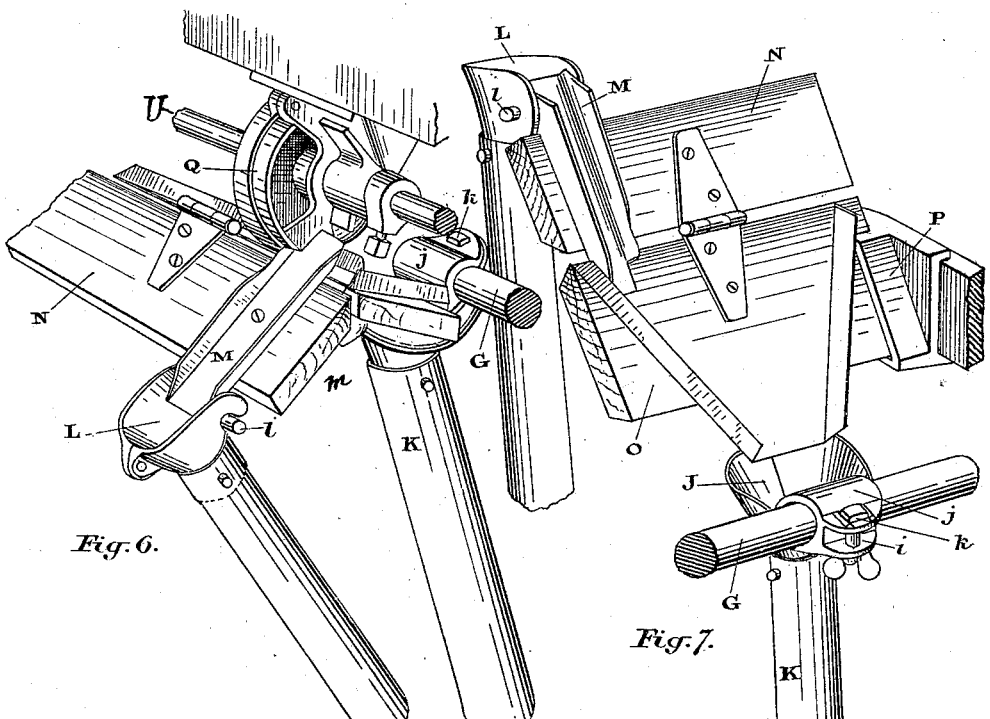

Figure 1 is a perspective view, showing one drill, one scatterer, and a portion of the frame and hopper. Fig. 2 is an enlarged perspective detail, showing a portion of the lifting-roller, one of its end brackets, and a portion of its lever. Fig. 3 is an enlarged perspective view of the bracket for connecting the axle to the frame of the machine. Fig. 4 is an enlarged perspective view of the grain-tube hopper, showing it as it will appear when being fitted into its tube. Fig. 5 is a similar view of the hopper, riveted and inserted into its tube. Fig. 6 is an end perspective view, showing the grain-conductor's board hinged to the scattering-board. Fig. 7 is a front perspective view of the same parts. Fig. 8 is a perspective view of the bracket for holding the scattering-board, and providing at the same time a support for the grain-conductor's board. Fig. 9 is a perspective view of the cup or casing of the distributing-wheel. Fig. 10 is a perspective view of the back portion of the cup or casing of the distributing-wheel. Fig. 11 is a perspective view of the loose back of the distributing-wheel. Fig. 12 is a perspective view of the revolving ring of the distributing-wheel. Fig. 13 is a perspective view of the loose sleeve, showing the wings forming a cut-off and a stop. Fig. 14 is a cross-section of the distributing-wheel and casing. Fig. 15 is a perspective detail of the device for operating the cut-off of the distributing-wheel. Fig. 16 is a perspective detail of the bracket for supporting the rack by which the distributing cut-off is operated. Fig. 17 is a detail of the rack. Fig. 18 is a perspective view of a dog. Fig. 19 is a side view of spring-drill. Fig. 20 is a perspective view of hoe.

In the drawings like letters of reference indicate corresponding parts in each figure.

A is the hopper end, supported by the main frame B of the machine, which frame is made of wrought-iron or steel, and extends around the machine in a rectangular form. It will be noticed that the hopper end A has an extension-piece cast on its front side, in order to form a support for the lifting-roller C. This lifting-roller C has a bracket, D, fastened at each end, which bracket has a small projection or pin, a, cast on it to fit into a gab or notch cut in the extension-piece referred to on the hopper end A, forming a pivot-point upon which the lifting-roller C will roll.

E is a lever fitted in a guide cast on the bracket D, and designed, when pulled backward, to fit into the notches b, made in the back of the hopper end A. As the drill F is connected to the roller C by the chain F', it will be seen that when the lever E is drawn backward, the roller C being thus caused to roll upwardly, it follows that the drill is raised to any required altitude, and when so raised is held there by the lever E being slipped behind one of the notches b. As the operator of the machine stands behind, it will be seen that the drill can readily be raised by him or lowered, when required, by operating the lever E.

As before mentioned, the main frame B of the machine is made of iron or steel, either a flat bar, as shown in Fig. 1, or an angle or T shaped bar. As a metal frame of this description would have a tendency to twist, we arrange to prevent this fault by making the main axle G of the machine to act as a brace.

As we claim nothing peculiar in the wheels or manner of applying them, they are not exhibited in the drawings. It will be sufficient for our purpose to say that the wheels revolve on the axle G, which is made stationary. To secure that end we provide a bracket, H, (see Fig. 3,) one for each side of the machine, and through which the axle G passes, as indicated in Fig. 1. A pinching-screw, I, is screwed into the bracket H, so that its point shall come in contact with the axle G. The axle is in this manner held rigidly to the bracket H, and as this bracket is securely fastened to the main frame B the axle G must necessarily constitute a brace to the frame, which will prevent the said frame from twisting or otherwise getting out of shape.

On reference to Fig. 3 it will be noticed that the bracket H is provided with flanges or lips d, for the purpose of grasping the frame B. It will also be noticed that lugs e are cast on this bracket, for the purpose of forming a support for the legs of the hopper end A, and also that a journal-box, f, is cast on the bottom of the bracket H, to receive the axle G, as shown. Bolt-holes g are provided to enable the bracket to be securely bolted to the frame.

On reference to Figs. 4 and 5 the construction of the grain-tube funnels will be understood. These figures represent the construction of the scattering-tube funnel, the funnel for the drill-tube being the same, except in the respect we will hereinafter point out.

It will be noticed on reference to Figs. 4 and 5 that the funnel J is made in two parts, which, when riveted together, as shown in Fig. 5, form the funnel. It will also be noticed on reference to Fig. 4 that the inner edges of the two parts which come together to form the funnel J are rounded off longitudinally to enable the diameter of the funnel-bottom to be contracted, as shown in Fig. 4, in order that the pins h, which are cast on the outside of each part, may pass from the mouth of the tube to the holes in the tube K, made to receive them. It will thus be seen that the funnel can very readily be put in position, and when in position the tube cannot become disconnected from it, as when the two parts are riveted together, as shown in Fig. 5, it will not be possible for the pins h to get out of the holes they fit into, made in the tube K. It will be further noticed on reference to these figures that a projection on one side of the funnel J forms the lower half, i, of an axle-bearing, and that a cap, j, is pivoted within the hoppers, so as to form the upper half of the axle-bearing. It will be further noticed that a bolt, k, secures the outside of the cap j to the lower half, i, of the axle-bearing. It will thus be seen that these parts are easily put together, and when the funnel is fitted onto the axle G the bearings thus formed may be made to grasp the axle by simply tightening the bolts k. As the scattering-tube is thus held on the axle G sufficiently rigid to perform its required work, it will of course slide around the axle should it at any time come against an obstruction, which might otherwise break or injure it. We may mention here that the funnel L for the drill-tube is made in the same manner as the funnel J, except that the axle-bearing is dispensed with, and, instead of it, lugs or projections l are formed on one side of the funnel L, for the purpose of hooking over pins formed on the end of the grain-conductor M. (See Fig. 6.) On reference to this figure it will be noticed that the grain-conductor M is attached to a board, N, which is hinged to the scattering-board O, and on reference to Fig. 7 it will be noticed that the scattering-board O is held rigidly to the frame B by fitting into a groove formed on the inside of the bracket P, which is bolted to the frame B. When the grain-conductor board N is set as shown in Fig. 6, it is supported by an arm, $m$, formed on the bracket P, as shown in Fig. 8. When so set, the grain falling from the distributing-wheel Q will be guided by the grain-conductor M into the drill-tube funnel L; but when the board N is set at the angle shown in Fig. 7, the grain falling from the distributing-wheel will be directed onto the scattering-board, and from it into the funnel J of the scattering-tube. There are many ways of holding the board N at the angle shown in Fig. 7. For instance, ordinary buttons might be used; or hooks might be arranged to secure it in that position.

Figs. 9, 10, 11, 12, and 13 show the grain-distributing wheel, casing, &c., composed of five parts. Q constitutes the main portion of the casing and directs the grain into the revolving rim of the wheel. Q' is the other half of the casing, forming a fixed ring, and is riveted or bolted to Q.

R is a ring having a corrugated inner surface, and which forms the revolving rim of the wheel. This rim R fits into Q', and has lugs $n$ cast on it to receive the wings $p$, cast on the loose back S. It will be noticed that the loose back S has a recess, $Q^2$, cast in its face to receive the end of the sleeve T, which sleeve is provided with two wings, $t$, to form the cut-off and stop.

U is the distributing-wheel rod or shaft, which passes entirely across the machine through the sleeve and back of each distributing-wheel. This shaft revolves freely within the sleeve T, but is secured to the loose back S by a set-screw, $s$. It follows that when the rod U revolves, the loose back is correspondingly moved, and as the wings $p$, cast on this loose back, fit between the lugs $n$, cast on the ring R, the said ring will revolve with the loose back, carrying with it the grain to the discharge-spout of the distributer-wheel.

A collar, V, secured to the rod U against the hub formed on the loose back S, and another collar, Y, secured to the same rod, U, but against the end of the sleeve T, prevent the loose back or sleeve from moving longitudinally on the rod U, so it is merely necessary to move the said rod U longitudinally in order to move the loose back within the rim R, for the purpose of reducing or enlarging the aperture through which the grain escapes from the distributing-wheel.

In order to regulate the size of the discharging-aperture in all the distributing-wheels simultaneously, we place on the rod U a rack, V', which rack is shaped substantially as shown in Figs. 15 and 17, and held to the rod U by two collars secured to the said rod.

W is a bracket, which forms a bearing for the rod U immediately below the rack V' and also a bearing in which the lever X is pivoted. A rack-quadrant is formed on or attached to the end of this lever, and is arranged to engage with the rack V'. It therefore follows that by moving the lever X on its pivot a longitudinal movement is imparted to the rod U, and through it the loose backs of all the distributers are simultaneously adjusted, the wings $p$ on the said backs permitting their adjustment without disconnecting them from the revolving rim R. As shown in Fig. 1, the lever X extends up one side of the hopper of the machine; but of course it should be near the center, not near the end, as represented in this figure. An index-plate, $x$, is attached to the hopper immediately below the end of the lever X. This index-plate is notched, so as to receive a lip formed on the end of the lever, and for the purpose of holding the lever at any desired angle required to adjust the apertures of the distributing-wheels.

As will be noticed by the foregoing description, our invention has all through been directed toward facilitating the construction of the various parts forming the machine. In order to carry this idea out in the construction of the spring hoe and drill, we make the following important improvements: Instead of employing bolts for connecting the braces and spring for operating the spring-hoe, we provide a dog, Z, which is shaped as shown in Fig. 18. This dog is pivoted to the drag-bars Z' at one end, while its other end is shaped substantially as shown, the lugs $z$ projecting beyond the drag-bars Z', and are hooked, as shown, for the purpose of receiving the braces $Z^2$. Between the lugs $z$ the dog Z is shaped substantially as shown, so as to receive the hooked end of the spring $Z^3$, which is shaped substantially as shown in Fig. 19. The other ends of the braces $Z^2$ are connected, as shown, to the casting $Z^4$, one end of which is bolted to the end of the bar Z'.

On reference to Fig. 19 it will be noticed that the drill $Z^5$ has a notch or gab, $w$, which gab is intended to fit between the drag-bars Z', over the bolt which connects the casting $Z^4$ to the said bars, a bolt-hole, $w'$, being intended to receive a bolt passing through the lower end of the casting $Z^4$. It will thus be seen that there is only one bolt used for connecting the drill to the spring-braces, and that the said drill may be put in and removed from its position without disconnecting the braces which connect the casting to the spring $Z^3$.

Fig. 20 represents the hoe, which, as will be noticed, has a gab, $w^2$, cut in its top end, which gab is intended to fit over the same bolt as the gab in the drill, so that it can readily be placed in the position of the drill when the said drill has been removed.

What we claim as our invention is—

1. In a combined seed-drill and broadcast scatterer, substantially as described, a series of drills, a lifting-roller provided with a bracket at either end, each bracket having cast thereon a pivot-pin which operates in a gab formed on the hopper, and one bracket having guide-bearings for an operating-lever, notches formed on the back of the hopper, and chains connecting the drag-bars with the roller, all combined, arranged, and operating as and for the purpose set forth.

2. In a seeding-machine, substantially as described, and in combination with the rectangular frame thereof and the riding-axle, a bracket secured to said frame and having an extended journal for said axle, and a set-screw operating in an aperture connecting with the said journal to lock the axle to the bracket for the purpose of bracing the frame to prevent twisting of the same, as set forth.

3. In a seeding-machine having a rectangular metal frame, the brackets H, having flanges or lips formed on them for the purpose of grasping the top and bottom edges of the frame, and a journal for supporting the main axle of the machine, in combination with the pinching-screws I, screwed into the journals for the purpose of grasping the axle and forming a rigid connection between it and the frame, as and for the purpose specified.

4. A scattering-tube funnel made in two parts, having the inner edges of each part longitudinally rounded to enable the diameter of the funnel-bottom to be contracted, so as to permit the lugs or pins which are cast on the outside of each part to pass from the mouth of the tubes to the holes in the tubes made to receive them, substantially as and for the purpose specified.

5. In a scattering-tube funnel made in two parts, the lower half of an axle-bearing formed on the front of the funnel, in combination with a cap pivoted within the funnel and forming the upper half of the bearing, a single bolt being provided for connecting the cap to the lower half of the bearing.

6. In a scattering-tube funnel provided with an axle-bearing made in two parts, which operate together to embrace said axle, a single set-screw adapted to lock the parts together and to adjust the friction so that the scattering-tube will give when the pressure thereon exceeds the amount of friction to which it is adjusted, as set forth.

7. A broadcast-scattering board held in brackets bolted to the frame of the machine, in combination with a board carrying the grain-conductors and hinged to the scattering-board, so that the grain-conductors may be readily adjusted for the purpose of directing the grain either into the drills or broadcast-scattering tubes.

8. A bracket arranged to be bolted to the frame of the machine, and having a groove to hold the end of the scattering-board rigidly in position, and an arm to support the end of the grain-conductor's board when set to direct the grain into the drill-tube.

9. In a seeding-machine, substantially as described, a casing, Q Q', the rim R, having internal corrugations and lugs, $n$, the back piece, S, secured to the rod U and having the wings $p$, and the sleeve T, having wings $t$, all combined and adapted for joint operation with the rod U, as set forth.

10. In combination with the distributing-wheel, as described, having the winged sleeve T, loosely hung on the rod U, and the back S, locked upon said rod at will, the adjustable set-blocks V and Y, one arranged upon the rod on either side of the wheel, and the whole adapted to serve as and for the purposes set forth.

11. In a seeding-machine, substantially as described, and in combination with a series of distributers, the discharge of grain from which is simultaneously regulated by the rod U, the bracket W, forming the lower bearing for the said rod, the rack V', secured to the rod U, the lever X, having segmental rack which engages with the rack V', and the hopper A, having scale $x$, the said scale being notched to receive corresponding lips on the lever X and lock the lever against accidental displacement, as set forth.

12. In combination with the drag-bars Z', dog Z, constructed as described, and the spring $Z^3$, the braces $Z^2$, the casting $Z^4$, pivoted to the drag-bars, and the single bolt $w$, adapted to serve in the gab $w^2$ of a hoe or drill, whereby either may be applied to or removed from its position without disconnecting the braces or spring, as set forth.

WALTER COULTHARD.
JOHN LARSEN.

Witnesses:
WM. A. FISHER,
A. CARSWELL.